(12) United States Patent
Levitt

(10) Patent No.: US 8,560,371 B2
(45) Date of Patent: Oct. 15, 2013

(54) SUGGESTING THINGS TO DO DURING TIME SLOTS IN A SCHEDULE

(75) Inventor: Randall J. Levitt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 12/238,763

(22) Filed: Sep. 26, 2008

(65) Prior Publication Data

US 2010/0082376 A1      Apr. 1, 2010

(51) Int. Cl.
*G06Q 10/00*      (2012.01)
(52) U.S. Cl.
USPC .................. 705/7.18; 705/7.13; 705/7.19
(58) Field of Classification Search
USPC ....................... 705/7.13, 7.18, 7.19
See application file for complete search history.

(56) References Cited

U.S. PATENT DOCUMENTS

| | | | |
|---|---|---|---|
| 5,790,974 A * | 8/1998 | Tognazzini | 455/456.5 |
| 6,047,260 A * | 4/2000 | Levinson | 705/7.15 |
| 6,101,481 A * | 8/2000 | Miller | 705/7.13 |
| 6,484,033 B2 * | 11/2002 | Murray | 455/456.3 |
| 6,604,059 B2 * | 8/2003 | Strubbe et al. | 702/178 |
| 6,678,685 B2 | 1/2004 | McGill et al. | |
| 6,781,920 B2 * | 8/2004 | Bates et al. | 368/10 |
| 6,879,965 B2 | 4/2005 | Fung et al. | |
| 6,901,592 B2 * | 5/2005 | Mar et al. | 718/102 |
| 7,003,735 B2 | 2/2006 | Edlund et al. | |
| 7,082,402 B2 | 7/2006 | Conmy et al. | |
| 7,084,758 B1 * | 8/2006 | Cole | 340/539.11 |
| 7,085,747 B2 * | 8/2006 | Schaffer et al. | 706/12 |
| 7,108,173 B1 * | 9/2006 | Wang et al. | 235/377 |
| 7,131,134 B2 * | 10/2006 | Trovato et al. | 725/46 |
| 7,139,722 B2 * | 11/2006 | Perrella et al. | 705/7.19 |
| 7,318,040 B2 * | 1/2008 | Doss et al. | 705/7.16 |
| 7,395,221 B2 * | 7/2008 | Doss et al. | 705/7.19 |
| 7,483,842 B1 * | 1/2009 | Fung et al. | 705/7.14 |
| 7,584,123 B1 * | 9/2009 | Karonis et al. | 705/26.3 |
| 7,703,048 B2 * | 4/2010 | Alford et al. | 715/747 |
| 7,707,256 B2 * | 4/2010 | Rollin et al. | 709/206 |
| 7,743,067 B2 * | 6/2010 | Ducheneaut et al. | 707/769 |

(Continued)

FOREIGN PATENT DOCUMENTS

| | | |
|---|---|---|
| JP | 2001350884 A | 12/2001 |
| KR | 1020020007790 A | 1/2002 |
| KR | 1020030079837 A | 10/2003 |

OTHER PUBLICATIONS

Kurkovsky, Stan et al., Using ubiquitous computing in interactive mobile marketing Pers Ubiquit Comput, vol. 10, 2006.*

(Continued)

*Primary Examiner* — Scott L Jarrett
(74) *Attorney, Agent, or Firm* — Turk IP Law, LLC

(57) ABSTRACT

Architecture for suggesting activities to be performed during time slots of a user schedule, such as a calendar application. In one implementation, a personal activity is suggested for a free time slot. In another implementation, a personal activity can be suggested for both a free time slot and a full time slot. The architecture can also apply filtering to generate suggestions based on user location, preferences (stated or learned), user history, user interaction with content and candidate activities, targeted advertising, and so on. The filtering can be applied to disparate sources of activity information to provide relevant activities for suggestion to the user. Revenue models can be applied as well. The architecture can be deployed as a client/server topology or solely on the client.

15 Claims, 11 Drawing Sheets

(56) References Cited

U.S. PATENT DOCUMENTS

| | | | |
|---|---|---|---|
| 7,743,098 B2* | 6/2010 | Anglin et al. | 709/204 |
| 7,752,188 B2* | 7/2010 | Lagerstedt et al. | 707/705 |
| 7,793,294 B2* | 9/2010 | Haeri | 718/102 |
| 7,818,197 B2* | 10/2010 | Cho et al. | 705/7.21 |
| 7,818,198 B2* | 10/2010 | Masselle et al. | 705/7.18 |
| 7,843,857 B2* | 11/2010 | Kim et al. | 370/271 |
| 7,881,957 B1* | 2/2011 | Cohen et al. | 1/1 |
| 7,941,133 B2* | 5/2011 | Aaron et al. | 455/418 |
| 8,281,341 B2* | 10/2012 | Ellis et al. | 725/50 |
| 2001/0049275 A1* | 12/2001 | Pierry et al. | 455/414 |
| 2002/0194246 A1* | 12/2002 | Moskowitz et al. | 709/102 |
| 2003/0014292 A1* | 1/2003 | Strubbe et al. | 705/8 |
| 2003/0204474 A1* | 10/2003 | Capek et al. | 705/64 |
| 2005/0125737 A1 | 6/2005 | Allen et al. | |
| 2005/0283308 A1* | 12/2005 | Szabo et al. | 701/207 |
| 2006/0126601 A1* | 6/2006 | Kim et al. | 370/352 |
| 2006/0200374 A1 | 9/2006 | Nelken | |
| 2007/0005408 A1* | 1/2007 | Boss et al. | 705/8 |
| 2007/0250370 A1* | 10/2007 | Partridge et al. | 705/8 |
| 2007/0260989 A1 | 11/2007 | Vakil et al. | |
| 2008/0032719 A1* | 2/2008 | Rosenberg | 455/466 |
| 2008/0033778 A1* | 2/2008 | Boss et al. | 705/9 |
| 2008/0040188 A1 | 2/2008 | Klausmeier | |
| 2008/0066018 A1 | 3/2008 | Zinn et al. | |
| 2008/0086455 A1* | 4/2008 | Meisels et al. | 707/3 |
| 2008/0175104 A1 | 7/2008 | Grieb et al. | |
| 2008/0195312 A1* | 8/2008 | Aaron et al. | 701/209 |
| 2009/0033633 A1* | 2/2009 | Newman et al. | 345/173 |
| 2009/0063239 A1* | 3/2009 | Baron et al. | 705/9 |
| 2009/0089133 A1* | 4/2009 | Johnson et al. | 705/9 |
| 2009/0100037 A1* | 4/2009 | Scheibe | 707/5 |
| 2009/0204600 A1* | 8/2009 | Kalik et al. | 707/5 |
| 2009/0254820 A1* | 10/2009 | Farouki et al. | 715/273 |
| 2010/0121665 A1* | 5/2010 | Boyer | 705/8 |

OTHER PUBLICATIONS

Park, Moon-Hee et al., Location-Based Recommendation System Using Bayesian User's Preference Model in Mobile Devices UIC 2007, 2007.*

Riekki, Jukka et al., Genie of the Net: Context Aware Information Management UBICOMP2001, Sep. 30, 2001.*

Pousman, Zachary et al., Design iterations for a location-aware event planner Per Ubiquit Comput, vol. 8, 2004.*

Liao, Lin et al., Location-based Activity Recognition in Advances of Neural Information Processing SYstems, 2005.*

Bellotti, Victoria et al., Activity-Based Serendipitous Recommendations with Magitti Mobile Leisure Guide CHI 2008 Proceedings, Apr. 5-10, 2008.* van Setten, Mark et al., Context-Aware Recommendations in the Mobile Tourist Applications COMPASS in Nejdl, W. & De Bra, P. (Eds.). AH 2004, LNCS 3137, 2004.*

Lee, Hong Joo et al., Context-Aware Recommendations on the Mobile Web OTM Workshops 2005, 2005.*

Cheverst, Keith et al., Developing a Context-aware Electronic Tourist Guide: Some Issues and Experiences CHI 2000, Apr. 1-6, 2000.*

Shankar, Anil et al., Sycophant: An API for Research in Context-Aware User Interfaces International Conferences on Software Engineering Advances, 2007.*

Nijhuis, Karel-Henk, Context Aware Services for Constrained Mobile Devices University of Twente, Jul. 25, 2007.*

Takeuchi, Yuichiro et al, CityVoyager: An Outdoor Recommendation System Based on User Location History UIC 2006, 2006.*

Issacs, Ellen et al., A Field Evaluation of the User Experience of a Mobile Recomender of Leisure Activities Palo Alto Research Center, 2008.*

Roberts, Michael et al., Scalable Architecture for Context-Aware Activity Detecting Mobile Recommendation System IEEE, 2008.*

Sohn, Timothy et al., Place-Its: A Study of Location-Based Reminders on Mobile Phones UBICompt, 2005.*

Conley, Kenneth et al., Towel: Towards an Intelligent To-Do List American Association of Artificial Intelligence, 2006.*

Berry, Pauline M. et al., A Personalized Calendar Assistant American Association for Artificial Intelligence, 2004.*

Modi, Pragnesh Jay et al., CMRadar: A Personal Assistant Agent for Calendar Management Agent Oriented Information Systems, Lectures in Computer Science, vol. 3508, 2005.*

Myers, Karen et al., An Intelligent Personal Assistant for Task and Time Management Al Magazine, vol. 28, No. 2, 2007.*

Stahol, Christop et al., Her and Now: A User-Adaptive and Location Aware Task Planner International Workshop on Ubiquitous and Decentralized User Modeling, 2007.*

"Outlook Web Access User Guide", Bolton Council, 2007, 35 pages.

International Search Report and Written Opinion mailed for PCT application PCT/US2009/055285, mailed Apr. 12, 2010, 11 pages.

* cited by examiner

_US 8,560,371 B2_

SUGGESTING THINGS TO DO DURING TIME SLOTS IN A SCHEDULE

BACKGROUND

The increasing demands on user performance and productivity have been partly responsible for making a scheduling application ubiquitous on most devices and systems commonly used by people today. Calendar applications, for example, have moved to the forefront of user tools for meeting deadlines, scheduling conferences, and completing projects in a timely manner, and generally, as a tool for reminding the user of things that need to be done.

Calendar applications are not only a sole client tool, but also can be network accessible to block out time across many users. In other words, user calendars can be made accessible to other users for blocking out time on an employee calendar or viewing the schedule of other users for meeting and planning purposes, for example.

In most user schedules, there are time slots where no activity has been booked. The user can manually determine what to use the time for by searching for interesting events or activities, investigating dates, locations, etc., all which take time away from other tasks. In another example, the user blocks out time for lunch, but does not want to expend the time in determining where to eat. No services exist that provide an automatic tool for performing this functionality for the user.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture suggests activities to be performed during time slots of a user schedule, such as a calendar application. For example, the architecture aggregates many different types of activity information from various data sources, matches that information with user preferences, incorporates a user's specific location, and matches such information and preferences with availability information on the user's calendar. In one implementation, a personal activity is suggested for a free time slot. In another implementation, a personal activity can be suggested for both a free time slot and a full time slot.

The architecture can also apply filtering to generate suggestions based on user location, preferences (stated or learned), user history, user interaction with content and candidate activities, targeted advertising, content placement, and so on. The filtering can be applied to disparate sources of activity information to provide relevant activities for suggestion to the user. Revenue models can be applied as well. The architecture can be deployed as a client/server topology or solely on the client.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
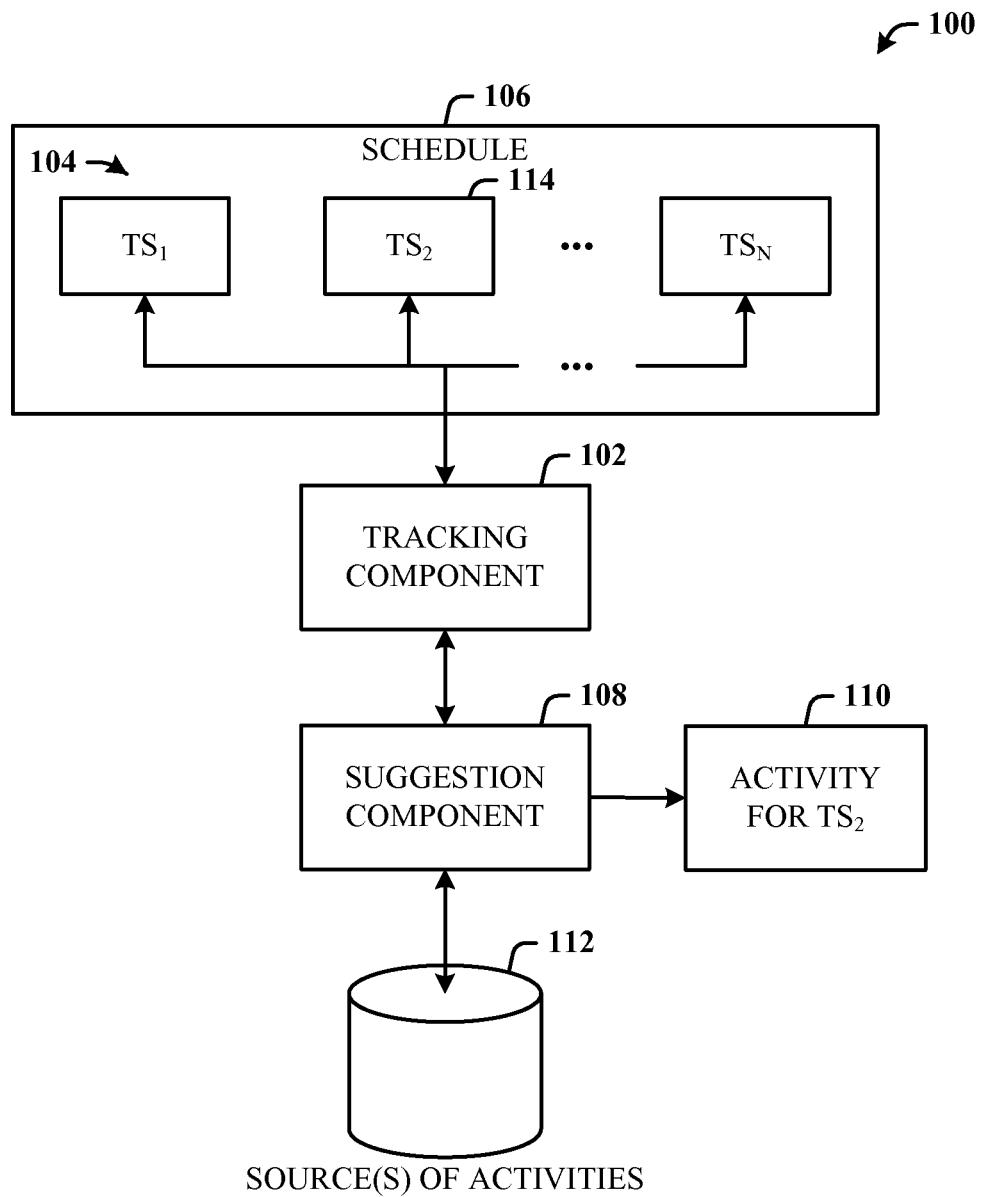
FIG. 1 illustrates a computer-implemented time management system in accordance with the disclosed architecture.

The disclosed architecture suggests activities to be performed during time slots of a user scheduling application, such as a calendar application. Activities can be suggested that are personal, business, or a combination of both. In one implementation, a personal activity is suggested for a free time slot in a corporate scheduling application. In other words, a client calendar application on the user's computer at the user's place of employment can be populated with personal activities the user desires to perform, rather than employer activities, or with work-related activities, as well. However, this is not to be construed as limiting, in that, any type of activity can be suggested for an open time slot and/or a full time slot. Moreover, the architecture is not restricted to a corporate environment, but can be employed publically for all consumers that utilize scheduling programs.

In addition to providing suggested activities for free time and busy time, the architecture can suggest activities to be performed based on upcoming events. For example, if user's schedule includes a date (e.g., user entered, company entered, etc.) in the future for the completion of a report, suggestions can be made earlier in time (e.g., during open time slots, blocked time slots) to the user to begin preparing the report, or begin researching data for preparing the report, for example. If the report completion is an important deadline, as tagged by the user or the entity that inserted the scheduled task, the suggestions for preparation and completion can be given higher priority over other suitable suggestions returned by the architecture.

In another example, if the scheduled activity was inserted into the user's schedule by a supervisor, this is an indication the scheduled meeting is important, and attendance to the meeting should not be jeopardized. Accordingly, suggestions for open time slots proximate to the meeting will be weighted to ensure that the user makes the event. In other words, if the meeting is at 1 PM, a suggested activity for a 1-hour time slot beginning at noon can be limited to staying on the corporate campus (e.g., walking the campus for exercise) rather than traveling to a distant business to perform a personal task, which could risk not making the meeting. This suggestion can also be based on traffic information obtained from traffic information sources (e.g., website) that would impede attending the meeting in a timely manner.

The suggested activities can be obtained from web-based sources (e.g., social networks), enterprise sources, client machines, other accessible information sources, or any combination thereof. For example, in one implementation, the user can select or prioritize the sources of suggested activities such that a suggestion from a first source will be given higher priority over a suggestion related to a second source. This can be changed on a time basis, as well. For example, if the first source is of the user's employer and the second source is an entertainment source, suggestions from the employer source can be given higher priority with one month of project completion, while entertainment suggestions will be given higher priority immediately after the project completion date, or one week before project completion (to begin preparing for vacation or a short relaxing break).

Additionally, filtering can be applied to generate suggestions based on user location, user hardware and software characteristics, preferences (stated or learned), past user behavior when interacting with content and suggested activities, targeted content, and so on. Revenue models can be applied as well. The architecture can be deployed as a client/server topology or solely on the client, for example.

In another example, the user places a parent birthday on the calendar. The system then suggests time for the user to shop for a gift for the parent two weeks before the birthday.

In yet another example, the user indicates on a to-do list a dinner engagement with another couple two weeks hence, but the location is yet to be determined. Five days before the approximate time the system suggests that the user block out time to choose a restaurant, generates a candidate list of suggestions, and provides links to the candidates for booking.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented time management system 100 in accordance with the disclosed architecture. The system 100 includes a tracking component 102 for tracking time slots 104 in a schedule 106 of a user, and a suggestion component 108 for suggesting an activity 110 (e.g., personal or otherwise) for an open time slot in the schedule 106. The personal activity 110 can be selected from one or more sources 112 of activity information. Here, a second time slot 114 (denoted TS$_2$) is an open time slot such that the activity 110 can be suggested to the user for insertion into the time slot 114.

The system 100 can be part of a scheduling program (e.g., a calendar application locally and/or web-based) or operate outside the scheduling program but interface thereto to provide the suggested activity. In other words, the system 100 suggests things for the user to do when not having activity filled in the calendar.

The system 100 can also suggest activities for the user to do during times already blocked out (filled in) in the calendar (schedule 106).

The system 100 includes a user interface (UI) that can show how the activity would look in the calendar by transparently blocking out the time as the user hovers the mouse over the time slot, for example. The user can see multiple external activities in the calendar. Users can move the mouse over the suggested activity or click on an activity to learn more about the activity. Purchases, bookings, and/or reservations can also be made, if desired.

The activities can be received from multiple sources such as event promoters, local newspapers, movie listings, restaurants, enterprise sources, etc. In a more specific implementation, the activities can be received from a dedicated server or multiple servers that are disposed on a network to provide this kind of activity information. The server(s) function as a consolidation point for disseminating activity information to other destinations such as client applications and/or other server applications. Access to the server(s) can be allowed by subscription, for example, or provided as a result of simply installing the client and/or server application that facilitate the capability of the disclosed architecture. More specifically, the end-user (e.g., client, server) can subscribe to obtain the activity information. Additionally, entities (e.g., vendors) can subscribe for the opportunity to push selected activity information to the end-users via the server(s).

The activities can include professional conferences (in week or month view), movies, concerts, local events (e.g., music events, fairs, parades, family, etc.), theater, sports, extension classes (at local universities), cooking classes, dining, food delivery, hiking trips, and so on, to name a few.

It is to be appreciated that there are many configurable options such as the user clicking to access more information about the activities, viewing by different time periods (e.g., day, week, month, etc.), viewing a small list of possible activities that expand to a bigger list, stating user preferences, and so on, which are described in more detail herein below. A list of candidate personal activities can be derived from which the personal activity is selected and inserted into the open time slot.

As will be described hereafter, further consideration for making the suggestion can be given to user preferences information, location information of the user, and other filtering criteria. Moreover, revenue models can be employed for targeted advertising and revenue sharing. For example, a cost-per-click (CPC) model, also referred to as a pay-per-click model, can be employed such that the advertiser only pays when the user selects the content to visit the advertisers website. Another revenue model, cost-per-action (CPA), can be employed where the advertiser pays for each action (e.g., make a purchase, fill out a form, etc.) taken by the user. These are just a few of the many models that can be implemented. For example, other models can include the cost-per-impression (CPI) model where fees are charged based on impression (content presentation) counts and/or the cost-per-mille (CPM) where payment by the advertiser is based on blocks of one thousand views.

Figure 2:
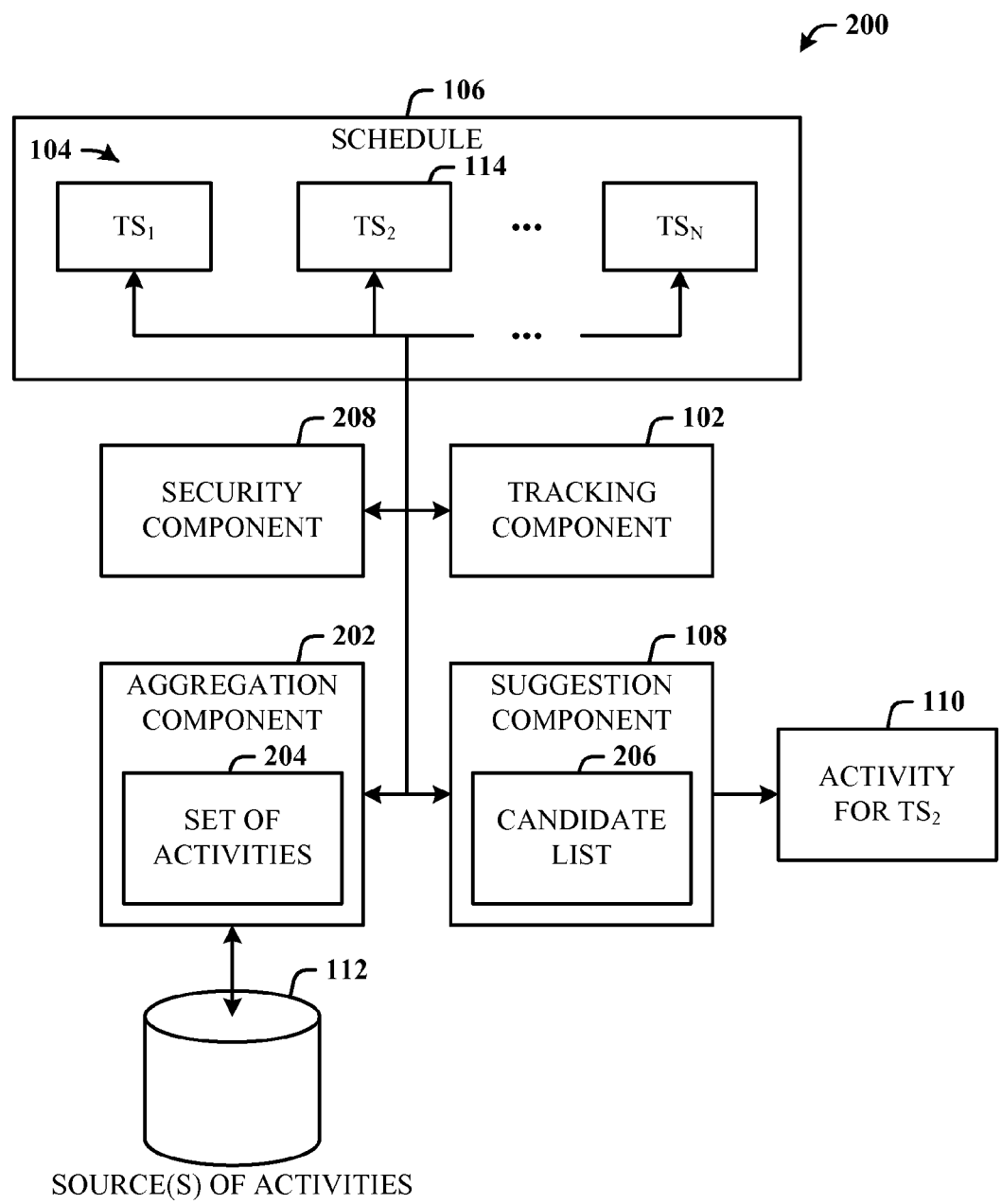
FIG. 2 illustrates an alternative time management system that employs aggregation.

FIG. 2 illustrates an alternative time management system 200 that employs aggregation. The system 200 includes the tracking component 102 for tracking time slots 104 in the schedule 106 of the user, and an aggregation component 202 for aggregating activity information from the disparate sources 112 of activity information based on filter criteria to obtain a set 204 of activities (e.g., personal). The suggestion component 108 suggests a candidate list 206 of personal activities from the set 204 based in part on filter criteria and from which the activity 110 can be selected for the second time slot 114 in the schedule 106.

The system 200 can also include a security component 208 for authorized and secure handling of user information (e.g., selections, preferences, interaction, etc.). The security component 208 allows the user to opt-in and opt-out of tracking information as well as personal information that may have been obtained. The user can be provided with notice of the collection of personal information, for example, and the opportunity to provide or deny consent to do so. Consent can take several forms. Opt-in consent imposes on the user to take an affirmative action before the data is collected. Alternatively, opt-out consent imposes on the user to take an affirmative action to prevent the collection of data before that data is collected. This is similar to implied consent in that by doing nothing, the user allows the data collection after having been adequately informed.

The security component 208 also allows the user to access and update profile information. For example, the user can view the personal and/or tracking data that has been collected, and provide corrections. Where sensitive personal information such as professional, health, and/or financial information can be tracked and obtained, for example, the security component 208 ensures that the data is stored using security measures appropriate for the sensitivity of the data. Moreover, vendor access to such information can be restricted using the security component 208 to control access only to authorized viewers and systems. In other words, the security component 208 ensures the proper collection, storage, and access to the user information while allowing for the processing, selection, and presentation of the personal activities that assist the user to obtain the benefits of a richer user experience and to access to more relevant information.

Figure 3:
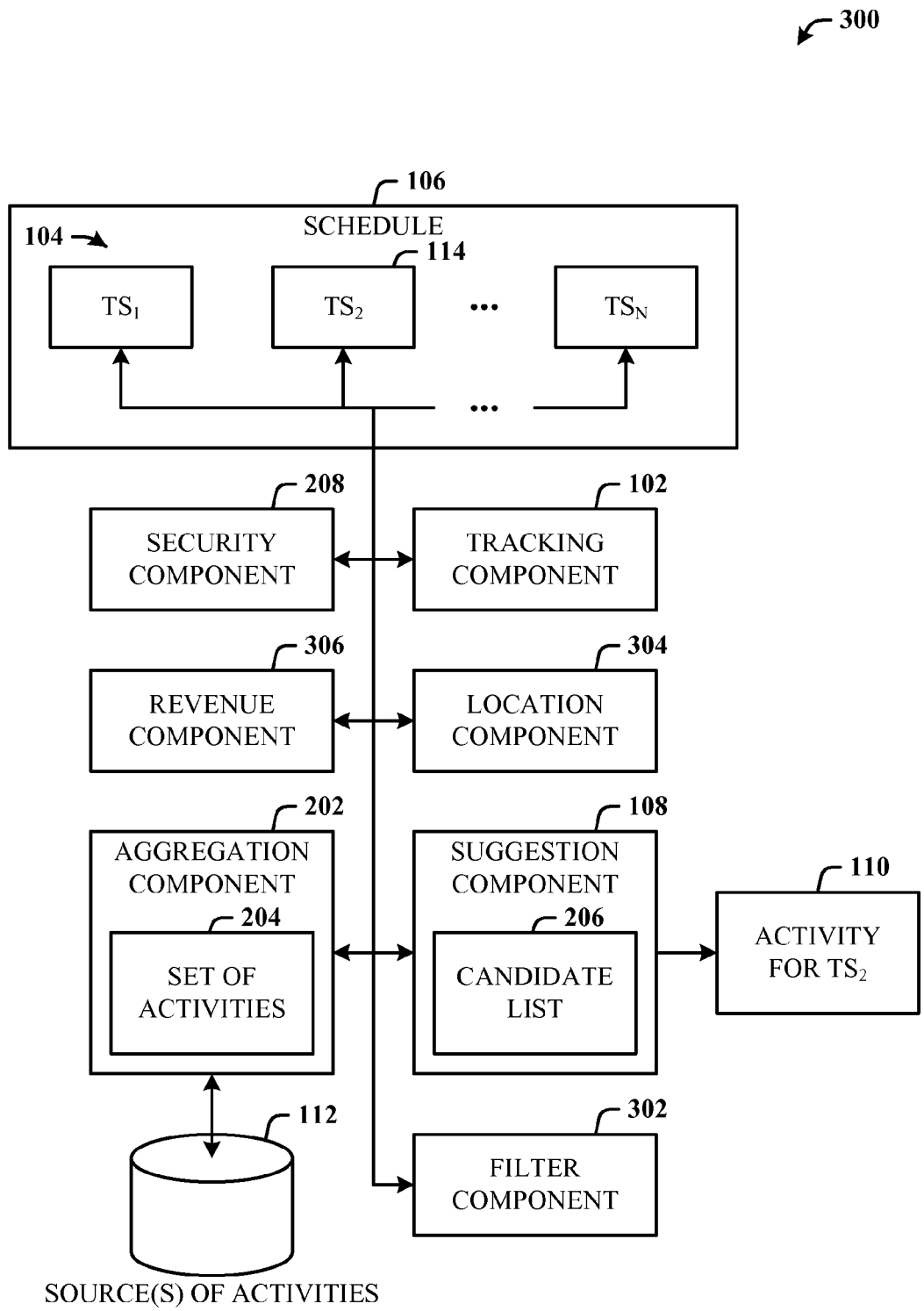
FIG. 3 illustrates yet another alternative implementation of a time management system that employs filtering, location information, and revenue models.

FIG. 3 illustrates yet another alternative implementation of a time management system 300 that employs filtering, location information, and revenue models. The system 300 includes the tracking component 102 for tracking time slots 104 in the schedule 106 of the user, the aggregation component 202 aggregates activity information from the disparate sources 112 of activity information based on the filter criteria to obtain the set 204 of activities. The suggestion component 108 suggests the candidate list 206 of personal activities from the set 204 based in part on filter criteria and from which the activity 110 can be selected for the second time slot 114 in the schedule 106. The system 300 can also include the security component 208 for authorized and secure handling of user information.

Additionally, the system 300 can include a filter component 302 for filtering the disparate sources 112 of activity information using the filter criteria. The filter criteria can be rules and policies that are processed along with or in lieu of other filter criteria. For example, a corporate policy may be imposed that when run prevents unacceptable content from being allowed into the enterprise network to be presented as candidate personal activity. In another example, where the disclosed scheduling architecture is run extensively in a corporate environment, a corporate policy can run that prevents personal activities from being suggested in an open user time slots across the enterprise where the specific time slot (e.g., 10-11 AM) will be taken by an upcoming corporate event (e.g., all division employee meeting) yet to be published to all employees (in other words, a preemptive blocking out of a time slot for groups of users). The time slot can be the second (or open) time slot 114, an already filled time slot, or both.

In yet another example, suggestions for the second time slot 114 can include the personal activities of the user, as well as suggested activities by the enterprise. For example, when a candidate list of activities (e.g., personal, business, or combination of both) is suggested and presented, the disclosed architecture can fold in suggestions for corporate activities that can also be part of the list. For example, a suggestion can be made in the open time slot to begin preparing the technical paper for upcoming professional organization, or take one hour and attend a meeting that is presented several times a year and may be required for maintaining the employee job position. There are many instances where employees may need to attain or maintain certifications that can be obtained via video presentations without a "live" instructor setting. Suggestions for meeting the requirements these certifications can be made in open time slots. Additionally, suggestions can be time limited to be filtered out of consideration for open (or blocked) time slots. For example, work-related suggestions that surface after the end of the business day can be filtered out of consideration, and that the work-related suggestions are brought back into consideration at the start of the business day.

Suggestions can be surfaced based not only on the time that the activity (e.g., personal, corporate, etc.) may occur relative to a given date, but also based on the importance of the activity to the user. For example, a more important activity (e.g., begin preparing a speech for an upcoming personal event) to the user can be ranked higher in the candidate list 206 than a less important activity (e.g., see new movie release).

The system 300 can also include a location component 304 for providing location information of the user. The personal activity suggested can then be based in part on the location information. For example, given that geographical location systems (e.g., global positioning system (GPS)) are becoming more prevalent in portable user systems such as cell phones, computers, and vehicles, suggestions surfaced in the candidate list 206 can be focused based on this information. If the user is on travel in a different city, the personal activity suggestions in the second time slot 114 can include activities in the geographic area. For example, if the user enjoys the outdoors, suggestions can include hiking, taking a brief walk, sightseeing, going to a restaurant nearby, and so on.

Still further, a user's personal list of "things to do" that may not be scheduled per se, but is accessible such as from another application or same application task list. Suggestion processing can then be based on this personal list. In one example, a generated suggestion can be to "go pick up clothes at the cleaners" (pulled from the personal list). A more complex example processes multiple items on the list, and makes suggestions according to an ordered set of steps scheduled within an open time slot. For example, in an open two hour time slot, first go pick up clothes from the cleaners, pick up medication at pharmacy, and then have lunch. In yet a more complex example, location is considered (using the location component 304) such that the ordered list of suggested steps are based on ultimately suggesting lunch as a location that results closest to the next to the most recent list item (here, picking up the medication). Other examples of multiple considerations (spatial and temporal) are intended to be within contemplation of the disclosed suggestion architecture, such as suggesting activities (e.g., dining, entertainment, business, etc.) during upcoming travel to a city when on a business trip, for example.

In yet another example, if the user has blocked out time for a business meeting scheduled for three days in distant city several weeks in the future, the suggestion architecture can retrieve and process this information alone or in combination with other pieces of information to access a flight information and ticketing website to obtain and suggest possible flights (or other modes of travel) to the city, as well as hotels reservations, restaurant, rental car, before- and after-work activities (e.g., entertainment), etc., in the city. Suggesting processing can also include other user ratings for activities, places, etc., in the city. This information can be obtained from local city websites and/or Internet-based websites that track user feedback on social aspects of the distant city. For example, weather conditions for the distant city can be obtained from a website and considered when generating the suggestions, which can impact indoor or outdoor activities.

As described herein, once a suggestion for a time slot has been generated the suggestion architecture can regenerate a new suggestion based on a change in circumstances. For example, if the user is completing a dining suggestion previously suggested, and is on now foot and decides to cancel an upcoming time slot, new suggestions can be automatically generated and presented to the user via a mobile device such as a cell phone. Moreover, since the location of the user may be ascertained (via the location component 304), the new suggestions can be related to things the user wants to do, but had previously scheduled for after work, and which can be achieved while will at or near the current location (e.g., within walking distance). Additionally, these candidate suggestions will exclude lunch since that has already occurred and it is not likely that the user will want to repeat that activity at this time.

The suggestion component 108 can also present suggestions in different formats. For example, one format can simply be a textual format, while an entertainment suggestion can include a short audio clip or video clip (e.g., if the activity is a movie, or concert), or a combination of multimedia.

The source(s) of activities 112 can also includes sources that receive user feedback in the form of ratings which can be considered when generating suggestions.

As described herein, the suggestion architecture has applicability to corporate environments as well as consumer environments. Suggestions can be provided by a vendor based on subscription to vendor products and/or services. For example, a mobile client can receive suggestions from a mobile carrier, suggestions that may have some affiliation with the vendor or contractors of the vendor.

The system 300 can also include a revenue component 306 that enables revenue models that provide revenue sharing and influenced selection of the suggested personal activity, for example. The revenue component 306 and location component 304 can work cooperatively to provide targeted activity information to the user based on the user location, for example. Moreover, vendors that pay more for the opportunity to advertise can have their product and/or services exposed more frequently to fill the open time slots of the user schedule.

It can be the case that an organizer scheduled a meeting, for example, which was automatically input to all meeting participant' schedules. The suggestion architecture makes suggestions for time slots relative to that meeting. Thereafter, the organizer changes the meeting to a different time slot. The suggestion architecture can then make the same or new suggestions based on the changed meeting time. In all cases, the suggestions can be communicated not only visually to the user while in the scheduling program, but by different communications means. For example, new suggestions based on the changed meeting time can be communicated to the user via text messaging (e.g., SMS (short message service), MMS (multimedia messaging service)), mail, phone call, voice mail, etc.

In an alternative embodiment, a single-purpose application (SPA) such as a gadget (also called widgets, for example) can be utilized to present one or more suggestions to a user instead of or in combination with the scheduling application. In other words, the SPA can receive a suggestion from the suggestion architecture and present the suggestion or list of suggestions for a given time slot. In yet another embodiment, the SPA interfaces to the suggestion architecture such that suggestions can be passed to the suggestion architecture based on a particular need of the user. For example, an SPA from an online ticketing entity can be provided as a plug-in to suggest events to the user, events that are only handled by that online ticketing entity.

Figure 4:
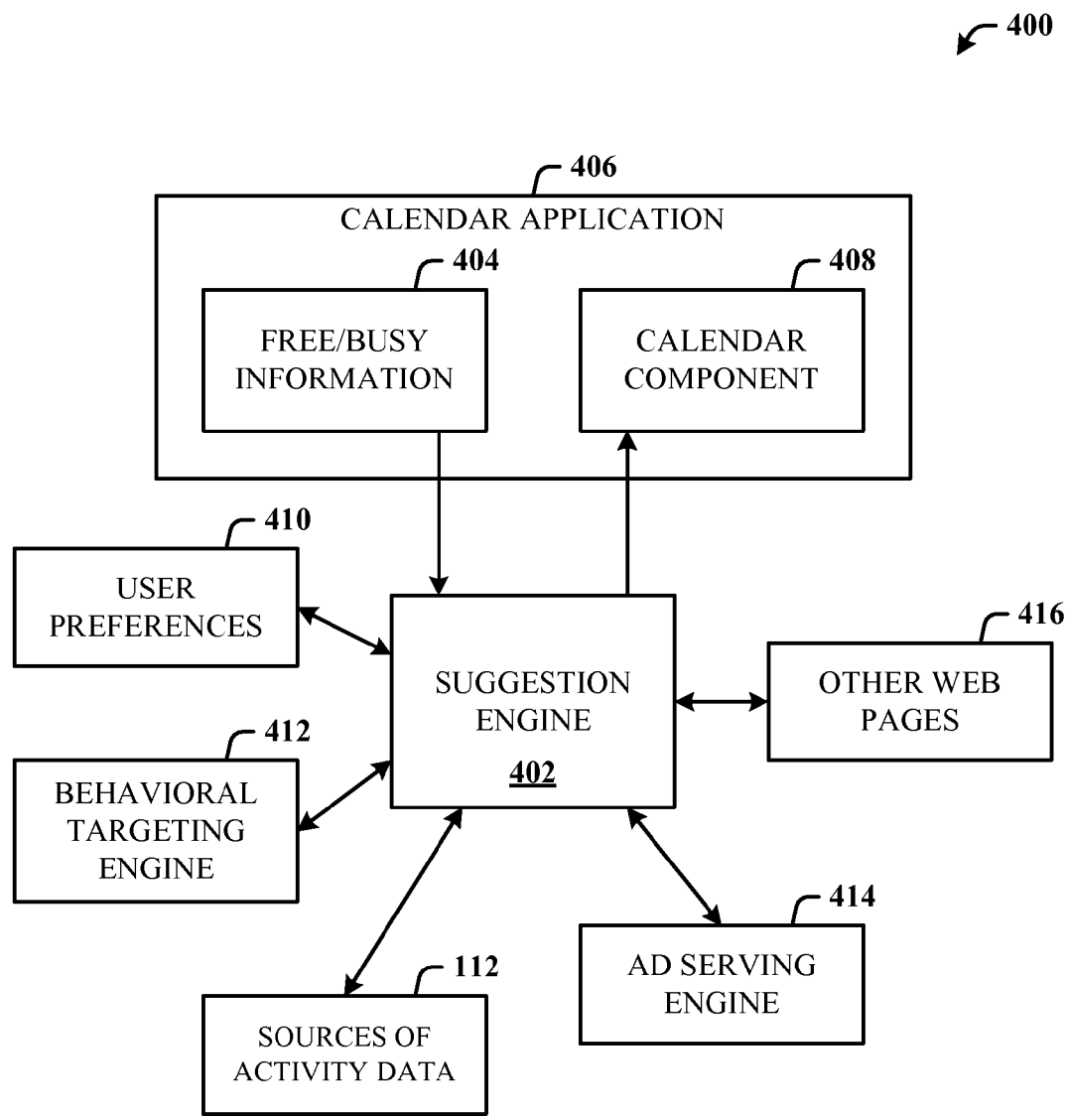
FIG. 4 illustrates an alternative representation of a time management system that generates suggestions for user time slots.

FIG. 4 illustrates an alternative representation of a time management system 400 that generates suggestions for user time slots. The system 400 includes a suggestion engine 402 that receives free and/or busy information 404 from a calendar application 406 (that drives the schedule 106 and other related components) and ultimately presents the candidate list of suggested activities back to a calendar component 408 of the calendar application 406.

The suggestion engine 402 receives and processes data and information from different entities to derive the candidate list of suggestions for one or more open or filled time slots. For example, the suggestion engine 402 can interact with user preferences 410 that the user provides as part of the suggestion architecture. The user preferences 410 can be stated as well as learned preferences. For example, the user stated preferences can include user address, physical information, demographic information, dining preferences (e.g., food choices, seating, etc.), music preferences (e.g., genres, groups, locations, etc.), professional and academic information, sporting events, and so on. In other words, the user preferences 410 can be as extensive as the user desires the suggestion experience to be. The more the information provided, the richer the experience.

Learned user preferences can be based on user interaction with the suggestions surfaced. For example, if the user frequently does not select a dining activity that is presented, it can be inferred that the specific dining activity should not be presented again, or at least not as often. Similarly, if the user more frequently selects a dining establishment at a specific time, the result can be to more frequently suggest this establishment on the candidate list for that time.

The frequency that the user selects or does not select a suggested candidate activity can be analyzed using a behavior targeting engine 412 that monitors user interaction with suggested activities to more accurately surface suggested activities over time. The targeting engine 412 can also monitor click-through of content presented on the UI, and also of the suggested activity to learn more about the activity before perhaps inserting the activity into the open time slot (or replacing an existing filled time slot). The targeting engine 412 can also receive feedback from the vendor that the user did actually attend the activity inserted in the time slot thereby providing more affirmative feedback as to user behavior and preferences.

Behavioral targeting ensures that the free time suggestions are relevant to the user. Targeted advertisements can be derived and made inside and outside of the calendar application 406. As described above, the disclosed suggestion architecture can take into consideration user privacy (and corporate privacy) concerns, when the security component 208 is implemented to do so. In such instances, the user can be allowed to opt-in or opt-out of advertising as well as targeted advertising that accesses user-related information. In one example, a user can opt-in for target advertising if the advertising is highly relevant. Other choices can also be made available to the user, as desired, such as to prevent the obtainment of travel information that could be exposed to unwanted use when exposed as a suggestion, for example, or even to prevent certain suggestions from be presented other than by secure login or other forms of access.

An advertising serving engine 414 can serve up advertising content based on information from the targeting engine 412 and user preferences 410 (stated and/or learned), for example.

The suggestion engine 402 can also suggest alternative web pages 416 for consideration. In other words, the suggestions on the candidate list can simply be inactive text that describes the activity, a brief description of the activity and active link to the business website, and/or simply a link to another website that may provide a more exhaustive list of similar activities form which the user can choose and move into the time slot.

Some activities can be sponsored to obtain more placement time. Additionally, restaurants, for example, can also pay to have placements suggested in the morning-to-lunchtime time slots.

Figure 5:
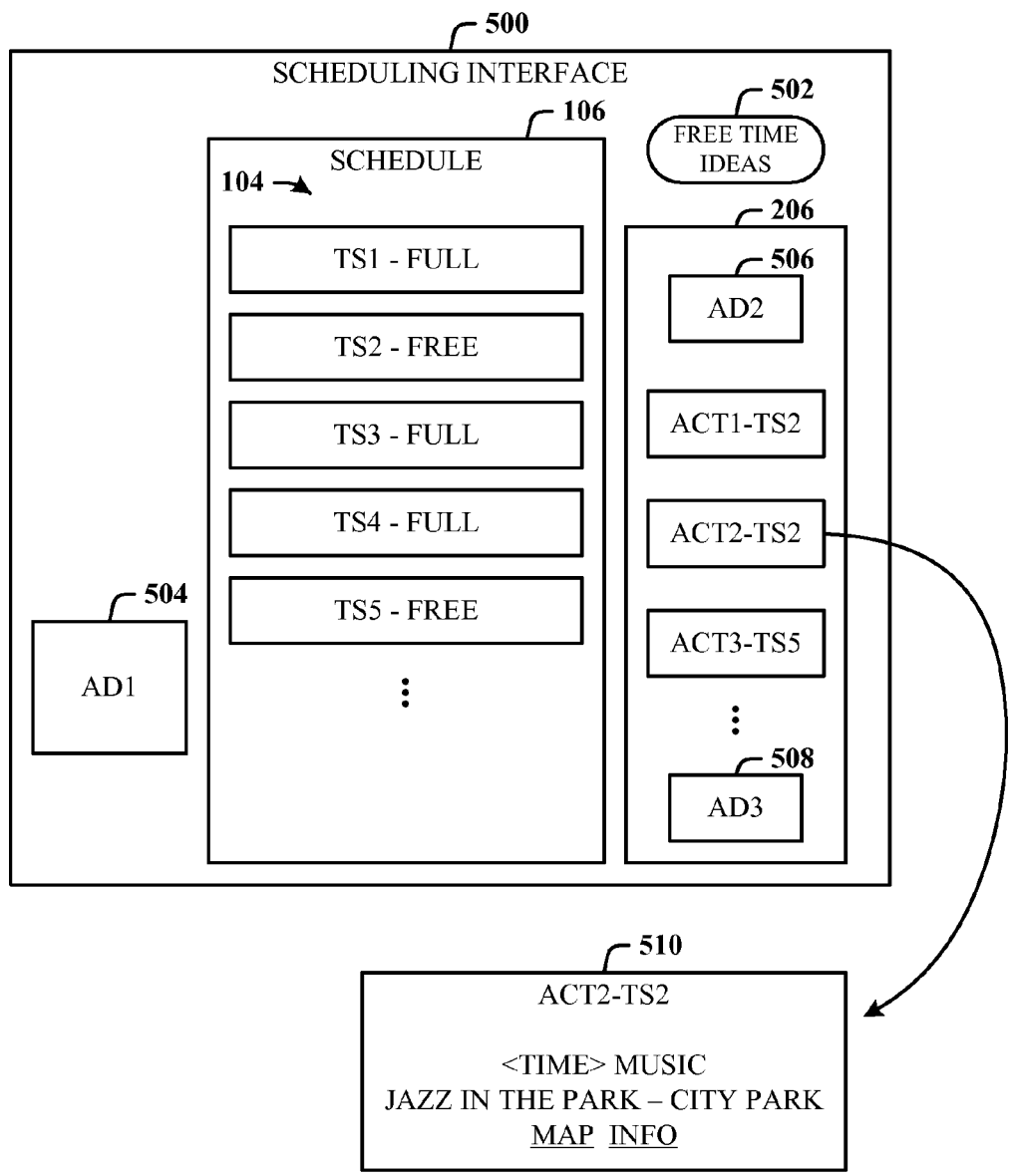
FIG. 5 illustrates an exemplary scheduling interface that employs the suggestion architecture.

FIG. 5 illustrates an exemplary scheduling interface 500 that employs the suggestion architecture. Portions of the scheduling interface 500 can be associated with a calendar application, for example, that can selectively show the time periods of the schedule 106 in days, weeks, months, etc. The interface 500 can include a selection 502 (denoted here as "Free Time Ideas") that when selected generates the candidate list 206 of activities. As previously indicated, the time slots 104 in the schedule 106 are tracked such that the suggested activities coincide with the free time slots, such as a second free time slot (TS) (TS2-FREE) and a fifth free time slot (TS5-FREE). Thus, the candidate list 206 of activities shows at least three suggested activities for the free time slots: a first activity (ACT1-TS2) for the second free time slot, a second activity (ACT2-TS2) for the second free time slot, and a third activity for the fifth free time slot (ACT3-TS5). In this particular example, no suggested activities are presented in the candidate list 206 for the full time slots (TS1-FULL, TS3-FULL, and TS4-FULL); however, as previously indicated, these can also be provided in combination with the free slot suggestions, or alternatively to the free slot suggestions.

The scheduling interface 500 can also present targeted and/or general advertisements. For example, a first advertisement 504 can be related to the time period in which the free slot or a group of free slots are available. If the second time slot (TS2-FREE) is early in the morning, the first ad 504 can be related to coffee or breakfast, for example. A second advertisement 506 can be presented as related to the candidate list 206, as well as a third advertisement 508.

Here, a blowup shows an example of the activity information 510 for the suggested second activity (ACT2-TS2). The activity information 510 can include the start time of the activity (which typically matches the start time of the free time slot), a descriptor (e.g., Music) the provides a general category of the suggested activity, the name of the activity (e.g., Jazz in the Park), the location of the activity (e.g., City Park), an active link (Map) to a mapping application for finding the directions to the activity, and an active link (Info) for finding additional information about the suggested activity.

The opportunity to access the scheduling interface 500 is not limited to only the calendar application, but can be made accessible from other applications as well, such as an email program, or a client that interfaces to a network-based scheduler such that user preferred activities can be offered up for insertion into the remote scheduler.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
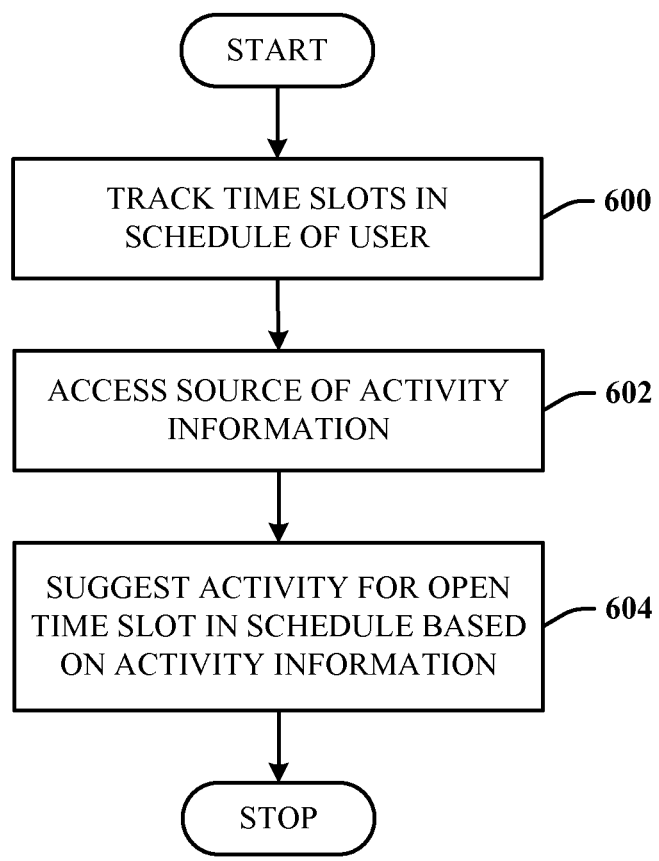
FIG. 6 illustrates a method of managing time in accordance with the disclosed architecture.

FIG. 6 illustrates a method of managing time in accordance with the disclosed architecture. At 600, time slots in a schedule of a user are tracked. At 602, a source of activity information is accessed. At 604, an activity (e.g., personal, business, etc.) is suggested for an open time slot in the schedule based on the activity information.

The method can further comprise suggesting an activity for a full time slot in the personal schedule, accessing user preferences, and suggesting the activity based on the user preferences.

The user may make multiple types of bookings in a calendar, each with assigned preferences for suggestions. For example, any work related appointment can be denoted as "busy". However, when making that appointment for "lunch" the system can suggest places to eat. Note that in this situation the architecture is not looking at free time, but rather at the user's desire. Additionally, if a user takes a business trip and blocks out a whole schedule, there will still be ample free time for suggestions.

The method generates a candidate list of activities based on user preferences and learned interactions from previously presented candidate activities, and places an activity in the candidate list based on a revenue model and frequency of user selections of activities from previous candidate lists. Additional information about the activity can be accessed via the candidate list before insertion of the activity into the open time slot. This also applies to a change in an already-scheduled time slot described herein above. The method can further comprise filtering the activity information based on user preferences and enterprise policies and, initiating and completing a commercial transaction via an active link associated with the personal activity.

Figure 7:
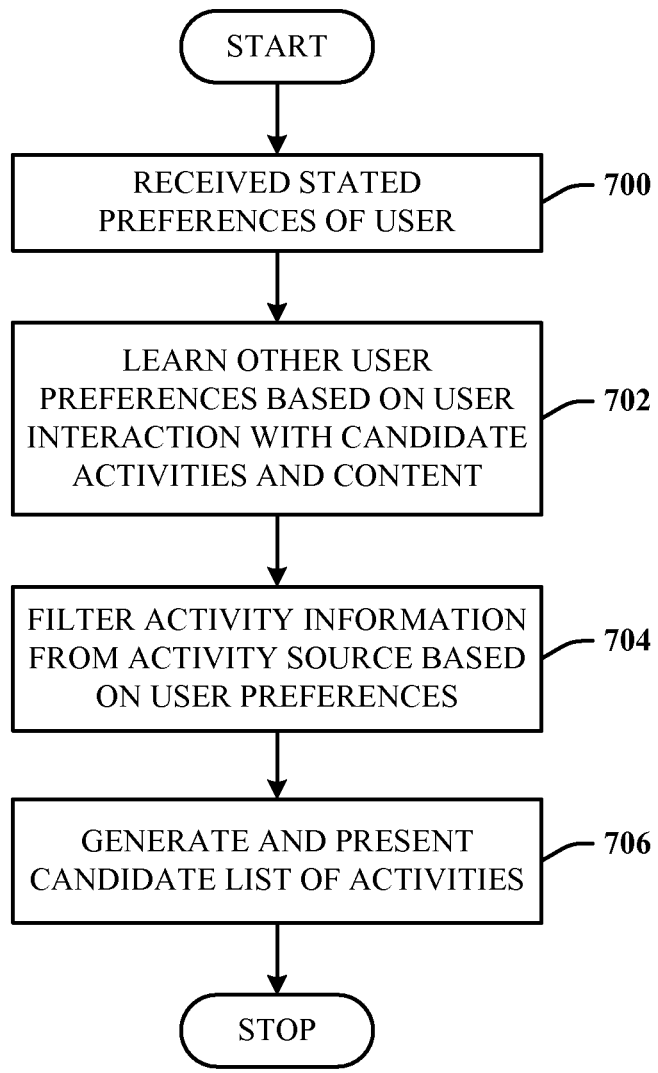
FIG. 7 illustrates a method of creating preferences information for suggesting activities.

FIG. 7 illustrates a method of creating preferences information for suggesting activities. At 700, stated preferences are received from the user. This can be from the scheduling application and/or from preferences obtained from other applications and locations. At 702, other user preferences can be learned based on user interaction with candidate activities and content. At 704, activity information obtained from activity sources is filtered based in part on the user preferences. At 706, the candidate list of activities is generated and presented based on the filtering.

Figure 8:
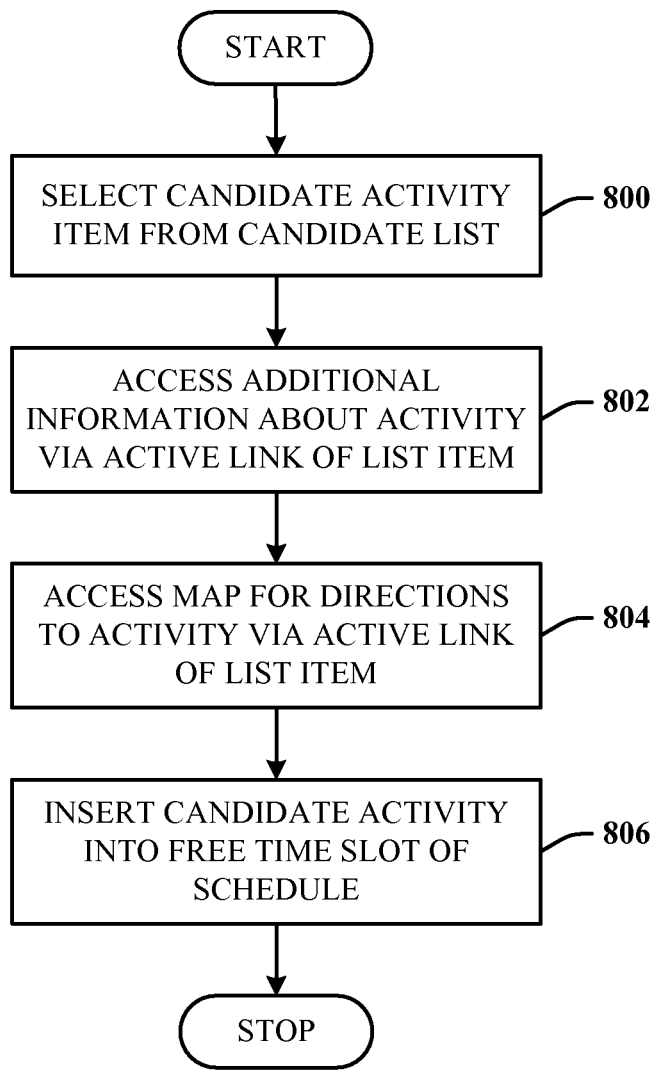
FIG. 8 illustrates a method of accessing information associated with a candidate activity.

FIG. 8 illustrates a method of accessing information associated with a candidate activity. At 800, a candidate activity item is selected from the candidate list. At 802, additional information about the activity is accessed using an active link of the list item. At 804, map information for directions to the activity location is accessed via an active link of the list item. At 806, the candidate activity is inserted into the free time slot of the schedule.

Figure 9:
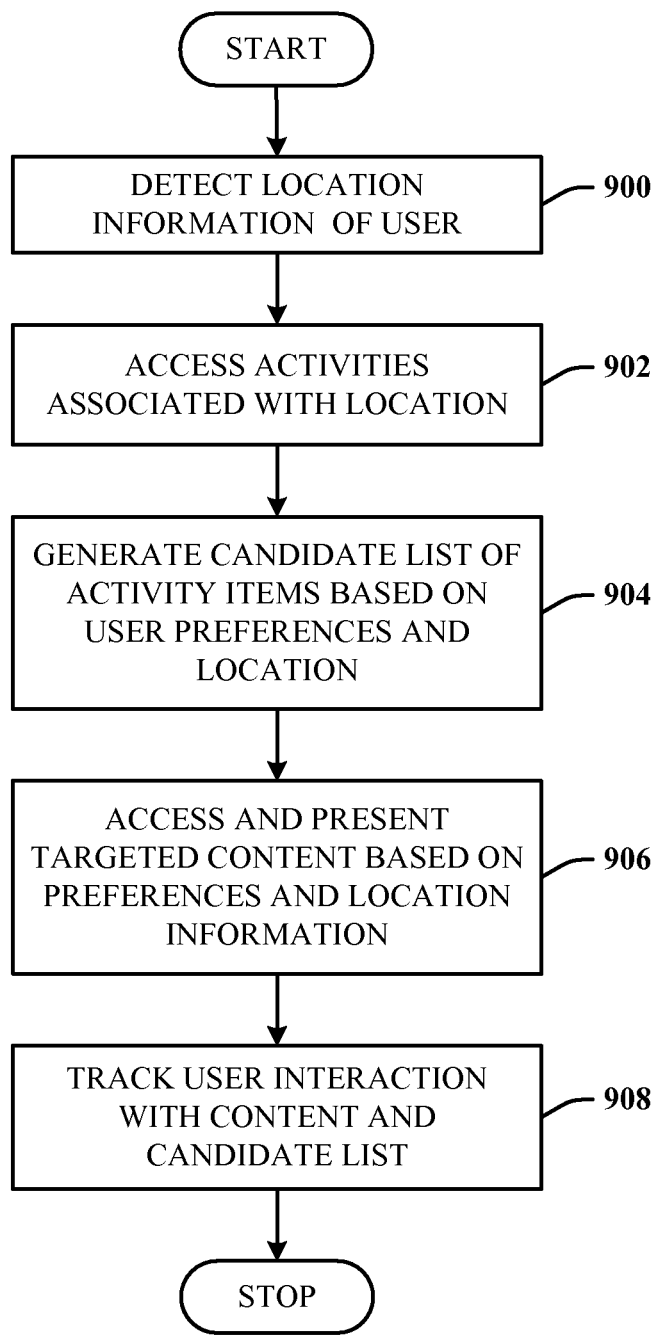
FIG. 9 illustrates a method of using location information for suggesting activities for time slots.

FIG. 9 illustrates a method of using location information for suggesting activities for time slots. At 900, location information of the user is detected. This can be obtained via geolocation systems such as GPS, for example. At 902, activities associated with the location are accessed. At 904, a candidate list of activity items is generated based on the user preferences and the location information. At 906, targeted content is generated, accessed, and presented based on the preferences and the location information. At 908, user interaction with the content and candidate list is tracked for future processing.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
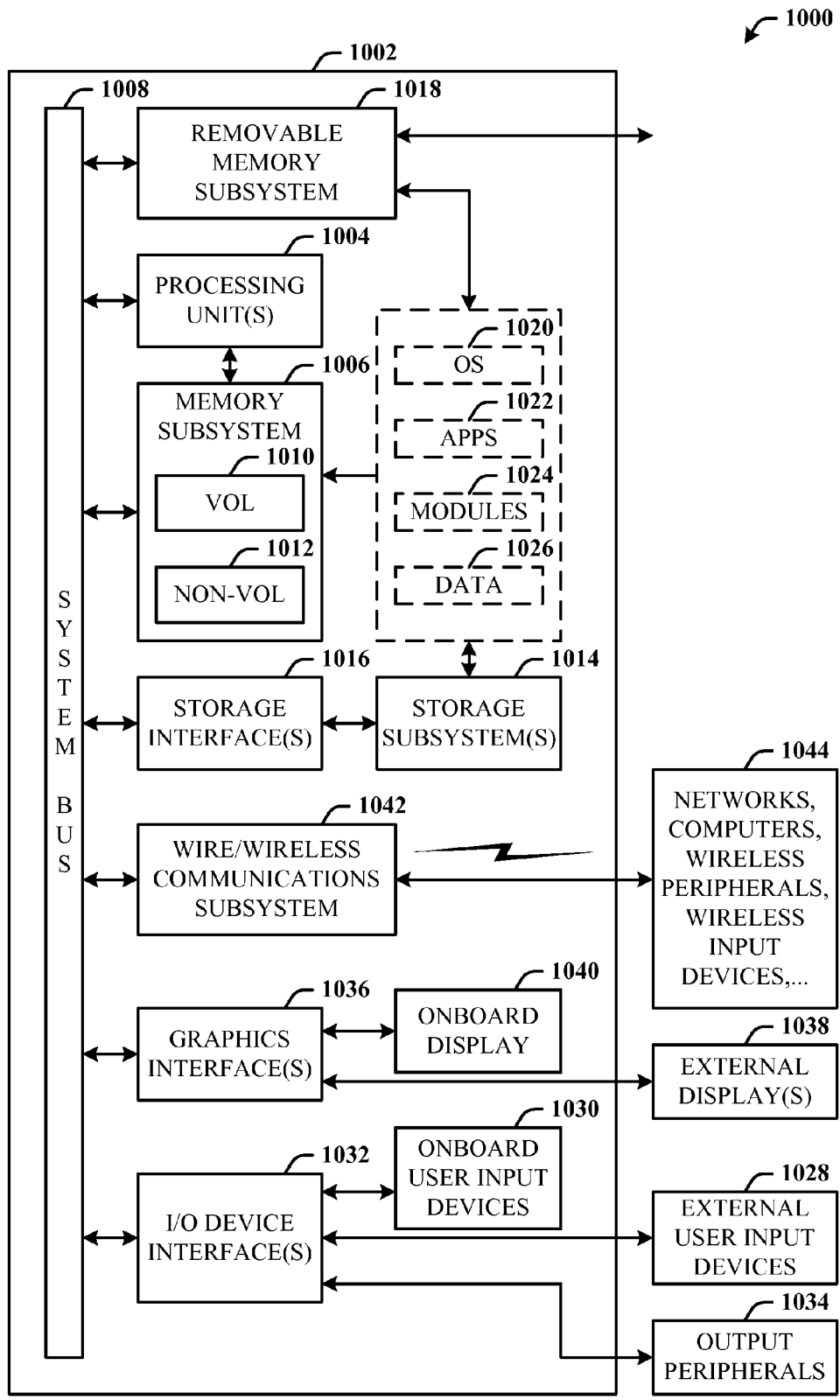
FIG. 10 illustrates a block diagram of a computing system operable to execute suggestion processing in accordance with the disclosed architecture.

Referring now to FIG. 10, there is illustrated a block diagram of a computing system 1000 operable to execute suggestion processing in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014, including an operating system 1020, one or more application programs 1022, other program modules 1024, and program data 1026.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such as a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wire/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wire/wireless communication subsystem 1042 (e.g., a network interface adapter, onboard transceiver subsystem, etc.) to communicate with wire/wireless networks, wire/wireless printers, wire/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 11:
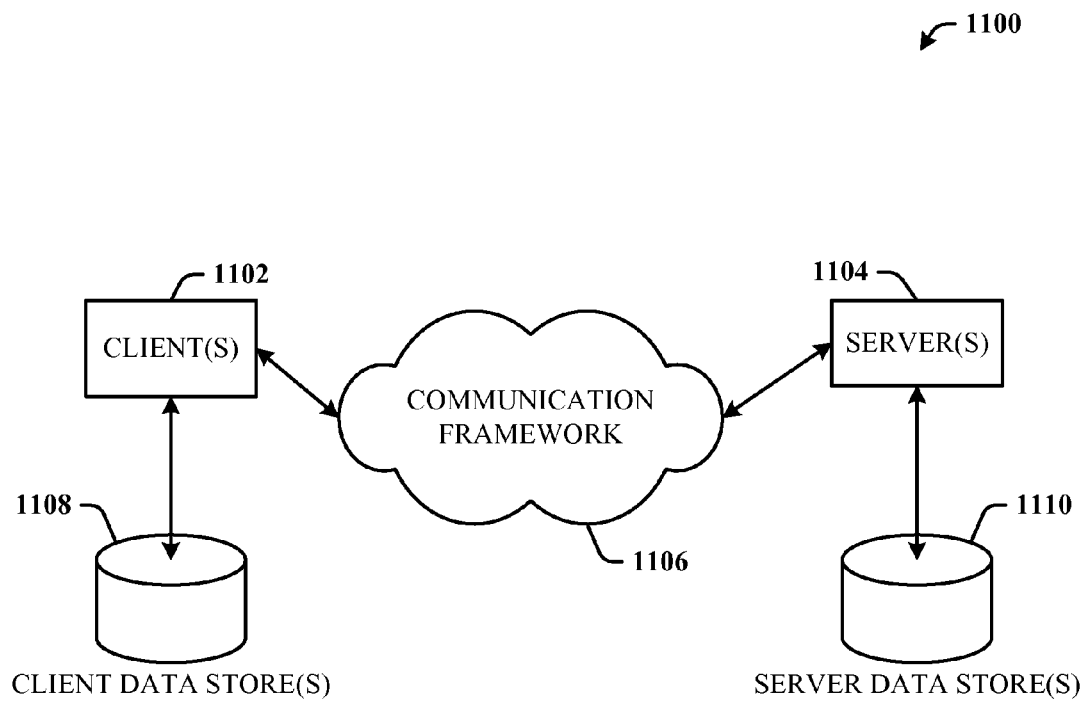
FIG. 11 illustrates a schematic block diagram of a computing environment for suggestion processing of activities in schedule time slots.

Referring now to FIG. 11, there is illustrated a schematic block diagram of a computing environment 1100 for suggestion processing of activities in schedule time slots. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

Various components of the system 100, 200, 300, 400, UI 500, and methods of FIGS. 5-9, can be employed solely as client(s) 1102, solely as server(s) 1104, or a client/server combination. For example, the activity sources can be network based while the scheduling application can be a client that interfaces to the server to receive updates from other user calendar applications or enterprise scheduling programs.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented time management system, comprising:
    a tracking component for tracking time slots in a schedule of a user; and
    an aggregation component for:
        aggregating activity information from disparate sources of activity information based on filter criteria to obtain a set of activities, wherein the set of activities is selected based on matching activity information with availability information on a user's schedule, a source of the activity information and a weighting of a suggested activity against an existing activity on the user's schedule;

a suggestion component for:
> generating a candidate list of personal activity suggestions based on at least one from a set of: user history, user interaction with content, targeted advertising, and content placement, the personal activities suggestions in the candidate list being ranked based on importance of the activity to the user such that a more important activity is ranked higher than a less important activity on the candidate list;
> selecting one or more of suggested activities suggestions based on matching activity information with availability information on a user's schedule, wherein the selected activity is suggested in one of: a textual format, an audio format, a video format, or a combination thereof;
> suggesting the selected activity for an open time slot in the schedule;
> weighting a suggested activity against an existing activity on the user's schedule;
> suggesting and displaying the one or more selected activities for a time slot filled by the existing activity on a user interface by transparently blocking out the time slot with one or more selected personal activities, wherein the suggested selected personal activities replaces the existing activity when one of the following conditions are satisfied:
> > the existing activity being a personal activity and the selected activity being a work-related activity;
> > the existing activity not having an "important" attribute assigned to it;
> > the existing activity being created by the user; and
> > a location for the selected activity being in a vicinity of a location for the existing activity when the existing activity is a work-related activity; otherwise not suggesting an activity for the time slot filled by the existing activity; and
> receiving user feedback related to the one or more selected activities in a form of ratings which are considered when generating future activities for the candidate list;

a security component for:
> authorizing secure handling of user information including a user's selections, preferences, and interactions including enabling the user to one of opting in and opting out of tracking user activity information; and
> enabling the user to access and update tracked user activity information.

2. The system of claim 1, further comprising a preferences component for receiving and processing user preferences information, the activity suggested based in part on the user preference information.

3. The system of claim 1, further comprising a location component for providing location information of the user, and the activity suggested is based in part on the location information.

4. The system of claim 1, further comprising a revenue component for enabling revenue models that provide revenue sharing and influenced selection of the suggested activity.

5. The system of claim 1, further comprising a presentation component for presenting a list of candidate activities from which the activity is selected and inserted into the open time slot.

6. The system of claim 5, further comprising a filtering component for imposing filter criteria on a sources of activity information to obtain the candidate list of activities.

7. A computer-implemented time management system, comprising:

a tracking component for tracking time slots in a schedule of a user;

an aggregation component for aggregating activity information from disparate sources of activity information based on filter criteria to obtain a set of activities, wherein the set of activities is selected based on matching activity information with availability information on a user's schedule, a source of the activity information and weighting a suggested activity against an existing activity on the user's schedule; and a suggestion component for generating, suggesting and displaying a candidate list of personal activities on a user interface by transparently blocking out an open time slot with a suggested time slot activity from the set based in part on filter criteria and from which a personal activity is selected for an open time slot in the schedule, wherein the selected activity is suggested in one of: a textual format, an audio format, a video format, or a combination thereof and the suggestion component configured to:
> generate the candidate list based on at least one from a set of: user history, user interaction with content, targeted advertising, and content placement, wherein personal activities suggested in the candidate list are ranked based on importance of the activity to the user such that a more important activity is ranked higher than a less important activity on the candidate list;
> weight the activities in the candidate list against the existing activity on the user's schedule based on one or more of the existing activity being a personal activity and the selected activity being a work-related activity, the existing activity not having an "important" attribute assigned to it, the existing activity being created by the user, and a location for the selected activity being in a vicinity of a location for the existing activity when the existing activity is a work-related activity;
> suggest the candidate list; and
> receive user feedback related to the candidate list of personal activities in a form of ratings which are considered when generating future activities for the candidate list; and a security component for authorizing secure handling of user information including a user's selections, preferences, and interactions, and wherein the security component is configured to enable a user to one of opting in and opting out of tracking user information and activity data and enable the user to access and update tracked user activity information.

8. The system of claim 7, further comprising a location component for detecting and providing location information of the user, the candidate list of personal activities suggested is based in part on the location information.

9. The system of claim 7, further comprising a revenue component for enabling revenue models that provide revenue sharing and influenced selection of the suggested personal activity.

10. A computer-implemented method of managing time, comprising:

tracking time slots in a schedule of a user;

accessing a source of activity information;

aggregating, by a processor, activity information from disparate sources of activity information based on filter criteria to obtain a set of activities, wherein the set of activities is selected based on matching activity information with availability information on a user's schedule, a source of the activity information and a weighting of a suggested activity against an existing activity on the user's schedule;

generating, by a processor, a candidate list of activity suggestions based on at least one from a set of: user history, user interaction with content, targeted advertising, and content placement, the activity suggestions in the candidate list being ranked based on importance of the activity to the user such that a more important activity is ranked higher than a less important activity on the candidate list;

selecting a suggested activity from the candidate list based on matching activity information with availability information on a user's schedule and the weighting of the suggested activity against an existing activity on user's schedule based on the source of the activity information;

suggesting the selected activity for an open time slot in the schedule, wherein the selected activity is suggested in one of: a textual format, an audio format, a video format, or a combination thereof;

suggesting and displaying the candidate list;

suggesting the selected activity for a time slot in the schedule filled by the existing activity when one of the following conditions are satisfied:
 the existing activity being a personal activity and the selected activity being a work-related activity;
 the existing activity not having an "important" attribute assigned to it;
 the existing activity being created by the user; and
 a location for the selected activity being in a vicinity of a location for the existing activity when the existing activity is a work-related activity; otherwise
 not suggesting an activity for the time slot filled by the existing activity;

displaying the suggested selected activity on a user interface displaying the time slots by transparently blocking out the open time slot with the suggested selected activity;

the user selecting the suggested selected activity to learn more about the suggested selected activity;

the user opting in and opting out of tracking user activity information; and the user accessing and updating tracked user activity information; and user to sending user feedback related to the candidate list of activities in a form of ratings which are considered when generating future activities for the candidate list.

11. The method of claim 10, further comprising accessing user preferences and suggesting the activity based on the user preferences.

12. The method of claim 10, further comprising placing an activity in the candidate list based on a revenue model and frequency of user selections of activities from previous candidate lists.

13. The method of claim 10, further comprising accessing additional information about the activity via the candidate list before insertion of the activity into the open time slot.

14. The method of claim 10, further comprising filtering the activity information based on user preferences and enterprise policies.

15. The method of claim 10, further comprising initiating and completing a commercial transaction via an active link associated with the activity.

* * * * *